United States Patent [19]

Jumonji et al.

[11] 3,977,792
[45] Aug. 31, 1976

[54] SYSTEM FOR DETECTING REFLECTING OBJECTS

[75] Inventors: Hiroshi Jumonji; Masayoshi Sunada, both of Hitachi; Shigeyoshi Kawano, Hitachiota, all of Japan

[73] Assignee: Hitachi, Ltd., Japan

[22] Filed: Dec. 16, 1974

[21] Appl. No.: 533,084

[30] Foreign Application Priority Data
Dec. 17, 1973 Japan............................ 48-139627

[52] U.S. Cl................................ 356/209; 250/202; 250/209
[51] Int. Cl.² ........................................ G06K 11/02
[58] Field of Search ............ 250/202, 209; 356/209; 330/59, 84, 124 R, 84, 58

[56] References Cited
UNITED STATES PATENTS

| | | |
|---|---|---|
| 3,624,538 | 11/1971 | Gere et al............................ 330/84 |
| 3,718,821 | 2/1973 | Vischulis............................ 250/202 |
| 3,881,568 | 5/1975 | Ando et al.......................... 250/202 |

Primary Examiner—John K. Corbin
Assistant Examiner—Richard A. Rosenberger
Attorney, Agent, or Firm—Craig & Antonelli

[57] ABSTRACT

In a system for optically detecting with a plurality of light detecting elements a reflecting object in the form of long stripe disposed on the surface of a traveling path, the average value of the respective electric quantities derived from the light detecting elements is obtained through arithmetic operation and the reference value is automatically changed according to the degree of the surface being soiled, by multiplying the average value by a certain safety factor, so that accurate detection can be performed independent of the degree of the soil on the traveling path surface.

9 Claims, 4 Drawing Figures

SYSTEM FOR DETECTING REFLECTING OBJECTS

FIELD OF THE INVENTION

This invention relates to a system for detecting reflecting objects in the form of long stripe, which system is used especially for the automatic guiding of a curve tracer or an optically controlled, driverless carrier vehicle.

DESCRIPTION OF THE PRIOR ART

A system for detecting reflecting objects finds its use not only in a curve tracer or an optically controlled, driverless carrier vehicle but in other numerous fields of application, but for convenience this invention as well as the conventional system of the same kind will be described here as applied to the optically controlled, driverless carrier vehicle.

The systems for guiding the drive of driverless carrier vehicles are classified into three groups: electromagnetic guiding systems, magnetic guiding systems and optical guiding systems. Of the three groups, the optical guiding systems are most preferable since in this system the traveling path can be prepared by a simple means as merely disposing a reflector such as aluminum tape on the traveling surface. The optical guiding systems, however, have a drawback that erroneous operations often take place due to the uncertainty in their optical detection. This is mainly because the proper detection of the reflecting object becomes difficult due to the deterioration in the reflectivity of the reflecting object that is caused by the dirt accumulated on the reflecting object during long use. And, if the detection accuracy is increased by some artifice, the frequency of the erroneous operations also tends to increase due to other factors involved. Now, the above description will be detailed further with the aid of the attached drawings.

Figure 1:
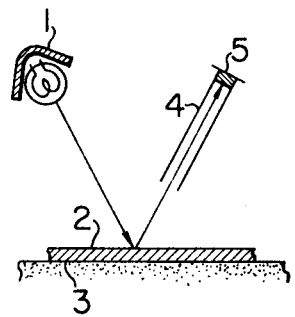
FIG. 1 illustrates the principle of a system for detecting reflecting objects.
Figure 2:
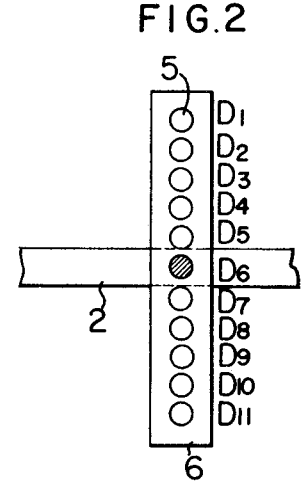
FIG. 2 shows the relative disposition of a reflecting object in the form of long stripe and a light detecting unit.

FIGS. 1 and 2 schematically show the optical parts of a system for detecting reflecting objects. In these figures, a light source 1 is a tungsten lamp or a fluorescent lamp which casts light upon the surface 3 of a traveling path with a tape-shaped reflecting object (hereafter referred to for brevity as reflector) 2 disposed thereon, as indicated by an arrow. A hood 4, at the bottom end of which is located a light detector 5 such as a silicon photo-detector or a CdS photoconductive element, serves to prevent the light detector 5 from collecting undesirable external light. A light detecting unit 6 comprises a plurality of light detecting elements $D_1$ to $D_{11}$, each of which is the same as the light detector 5. A driverless carrier vehicle equipped with the light source 1, the hood 4, and the light detecting unit 6 travels along the path provided with the reflector 2. With this construction, when the light is emitted from the source 1, one or some of the light detecting elements $D_1$ to $D_{11}$ will receive the light reflected from the reflector 2. Accordingly, the position of the vehicle relative to the reflector 2 can be detected by detecting whether the internal electric resistances of the elements $D_1$ to $D_{11}$ are greater than a predetermined reference level or not. Namely, the driverless carrier vehicle can be automatically, i.e. driverlessly, run along the reflector 2 by steering the vehicle in such a manner that the deviation of the vehicle from the reflector 2 is always corrected by controlling the relative position.

Figure 3:
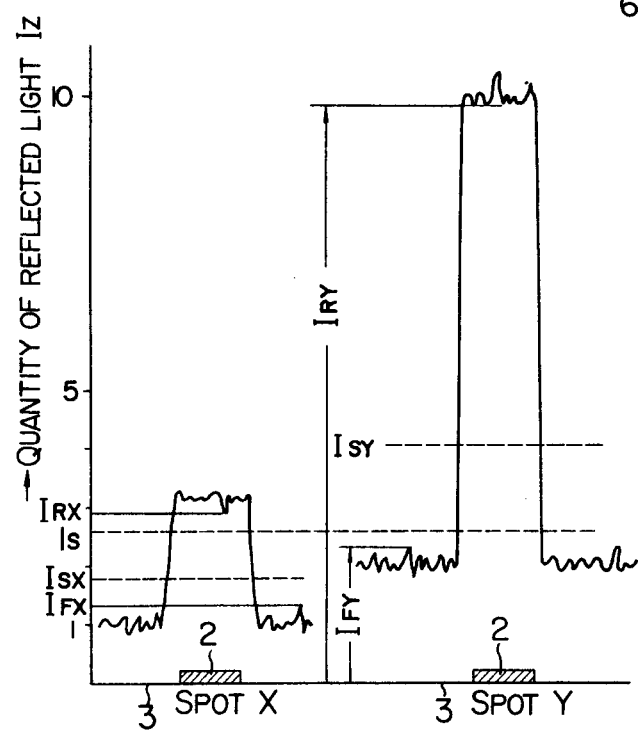
FIG. 3 shows relationships between the quantity of light reflected from the light reflecting object and the detecting levels of the light detecting unit.

If the reference level for the detection of the quantity of reflected light is fixed to a certain value, in the detection system described above, the following disadvantage will be caused. In FIG. 3 which is useful for the explanation of the disadvantage in question, the spot X is the most soiled point on the traveling path surface 3 and the spot Y the cleanest point on the traveling surface 3. Accordingly, it may be reasonably assumed that the reflector 2 is soiled to the utmost degree at the spot X, with the lowest reflectivity while it is the cleanest at the spot Y, with the highest reflectivity. In FIG. 3, the spots X and Y are located on the abscissa while the ordinate measures the quantity of light reflected from the traveling surface 3 and the reflector 2 on the spots X and Y. Now, how the previously mentioned reference level $I_s$ is determined, will be considered. Namely, the reference level $I_s$ must be greater than the maximum value $I_{FY}$ of the quantity of the light reflected from the traveling path surface 3 on the spot Y and smaller than the minimum value $I_{RX}$ of the quantity of light reflected from the reflector 2 on the spot X. For if the reference level $I_s$ is outside the above defined range, the light detector 5 cannot discriminate between the light reflected from the reflector 2 and that reflected from the traveling surface 3. Thus, the allowable range within which the reference level $I_s$ is to be set, is very narrow, that is, between $I_{RX}$ and $I_{FY}$. The reference level $I_s$ is especially near to $I_{RX}$ on the spot X and to $I_{FY}$ on the spot Y. Consequently, erroneous operation will easily take place due to the variation in the quantity of light emitted from the light source 1, the fluctuation of the drift in the light quantity comparing section described later, etc. In order to eliminate such erroneous operation, it is necessary to always keep clean the surface 3 of the traveling path inclusive of the reflector 2. This requires much labor and time for maintenance.

SUMMARY OF THE INVENTION

One object of this invention is to provide a system for securely detecting the reflector even if the surface of the traveling path is soiled or the quantity of light emitted from the surface is varied.

Another object of this invention is to propose a reference level for the proper detection in the system.

According to this invention, there is obtained a system in which the average of the electric signals from plural light detecting elements is calculated and the average value is multiplied by a suitable safety factor, so that the reference level is automatically changed in accordance with the degree of the surface being soiled.

DETAILED DESCRIPTION OF THE PREFERRED EMBODIMENT

According to one embodiment of the present invention, the reflector 2 can be securely detected even in the soiled places on the traveling path surface 3, by discriminating between the quantity of light reflected from the reflector 2 and that of light reflected from the surface 3 by the use of a relative ratio. Usually, the soiled reflector 2 is accompanied by the soiled surface 3 so that the reflectivity as a whole on the soiled spot is low and the quantity of light reflected from the soiled spot is small. However, the reflectivity of the reflector 2 is at least several times as large as that of the surface 3 and therefore the quantity of light reflected from the reflector 2 is also several times as large as that of light reflected from the surface 3. This invention provides a new system for detecting the reflector 2 by effectively utilizing the ratio of light quantity from the reflector 2 to that from the traveling path surface 3.

In case of running a driverless carrier vehicle according to the optical guiding system, the quantity of light reflected from the reflector 2 decreases as the reflector 2 is gradually soiled or stained and if the reference level $I_s$ is kept constant, $I_s$ must be set to be larger than the quantity $I_{FY}$ of light reflected from the cleanest point (spot Y) on the traveling path surface 3. On the other hand, since the quantity of light reflected from the reflector 2 decreases also with the accumulated soil on the surface 3, $I_s$ must be smaller than the quantity $I_{RX}$ of light reflected from the reflector 2 on the most soiled spot (spot X). This has already been described above. Consequently, as the dirt on the traveling surface 3 increases, the interval between the reference level $I_s$ and the quantity $I_{RX}$ of light reflected from the reflector 2 narrows. This leads to erroneous operation taking place. As apparent from FIG. 3, however, even on the spot X, $I_{RX}$ is several times as large as $I_{FX}$, though the ratio of $I_{RX}$ to $I_{FX}$ (hereafter referred to as S/N ratio) has a small value. Therefore, if the reference level $I_s$ is changed in response to the variation in the reflectivity of the traveling surface 3, the reflector 2 can be securely detected independent of the dirt on the traveling surface 3 inclusive of the reflector 2. However, other problems are caused here such that the detection of the variation in the reflectivity of the traveling surface 3 by a special device encounters difficulties and such that the number of the parts used is adversely increased. In view of the above problems, an average value $I_{SX}$ or $I_{SY}$ is obtained from the respective quantities of reflected lights detected by the plural light detecting elements $D_1$ to $D_{11}$ shown in FIG. 2 and the average value is treated as the quantity of the reflected from the traveling surface 3. Since one or two light detecting element 5 receives always the light reflected from the reflector 2 while the driverless carrier vehicle is in motion, the average value $I_{SX}$ or $I_{SY}$ is apparently larger than $I_{FX}$ or $I_{FY}$, respectively. The experiment with aluminum tape used as reflector shows that the S/N ratio obtained through actual measurments is several to tens. Now, let the case of the maximum dirt such that the S/N ratio is 2, be considered and let it be assumed simultaneously that eleven light detecting elements $D_1$ to $D_{11}$ are used as in FIG. 2 and only the element $D_6$ receives the light reflected from the reflector 2 while the other elements $D_1$ to $D_5$ and $D_7$ to $D_{11}$ receive the lights reflected from the traveling path surface 3. In this case, if the quantity of light reflected from the surface 3 and received by each of the light detecting elements $D_1$ to $D_5$ and $D_7$ to $D_{11}$ is $I_F$, the quantity of light reflected from the reflector 2 and received by the light detecting element $D_6$ is $2I_F$. Accordingly, the average quantity $I_Z$ of light received is $1.1I_F$, as is apparent from the following formula:

$$I_z = \frac{10I_F + 2I_F}{11} = 1.1I_F$$

If the average value $1.1I_F$ is used as such a reference level as described above, it is theoretically possible that the light detecting element $D_6$ is turned on to detect the reflector 2. However, this average value is very near to the quantity $I_F$ and if $T_F$ has a fluctuation of more than 10 %, some light detecting elements other than $D_6$ may be turned on to cause an erroneous operation. Therefore, the average value is multiplied by a safety factor, e.g. 1.5, to prevent such an erroneous operation, and the improved reference level $I_s$ is such that $I_s = 1.5I_z = 1.65I_F$. Consequently, the reference level $I_s$ has an allowance of about 40 % for the detection of the traveling surface 3 and an allowance of about 22 % for the detection of the reflector 2. Here, the allowance is defined by the expression:

$$\frac{|\text{reference level} - \text{detected level}|}{\text{referance level}}$$

The allowance can be arbitrarily determined by appropriately choosing the safety factor. Further, in case where the S/N ratio is very great, say, S/N = 50, for the reason that the reflector is new, the average quantity $I_Z$ of reflected light is $5.45I_{F'}$, as is apparent from the expression:

$$I_z = \frac{10I_{F'} + 50I_{F'}}{11} = 5.45I_{F'}$$

Multiplied by the safety factor of 1.5 in the same manner as before, the reference level $I_S$ is such that $I_S = 1.5I_z = 8.2I_{F'}$. This value gives an allowance of 88 % for the detection of the traveling surface 3 and a very great allowance of 510% for the detection of the detector 2.

In FIG. 3, $I_{SX}$ and $I_{SY}$ are respectively the reference levels for the spot X (S/N = 3) and the spot Y (S/N = 5) and it is seen that they are more preferable for the purpose of preventing the erroneous operations than the fixed reference level $I_s$.

Figure 4:
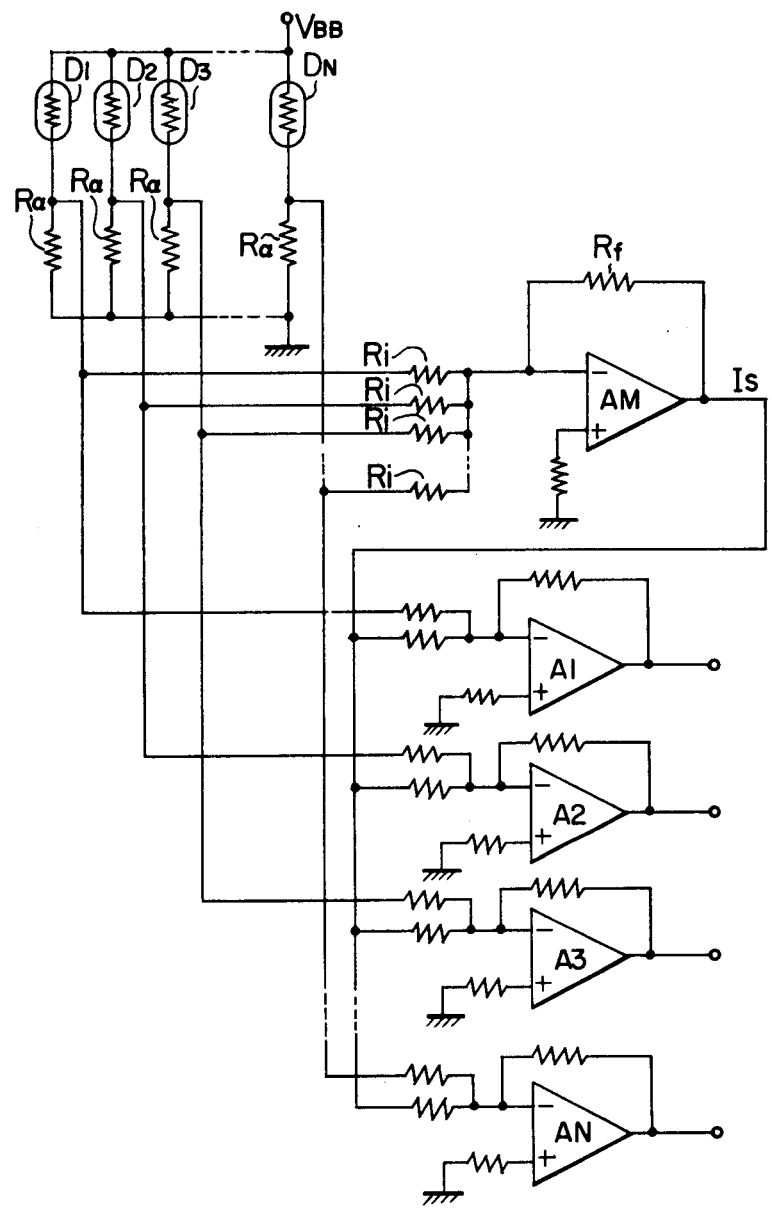
FIG. 4 is a circuit diagram of the system for detecting reflecting objects.

FIG. 4 shows a circuit of a system for detecting objects, embodying this invention. In FIG. 4, $D_1$ to $D_N$ indicate light detecting elements of, for example, CdS and the voltages according to the quantities of lights received by the elements $D_1$ to $D_N$ are developed across the resistors $R_d$ connected in series with the elements $D_1$ to $D_N$. By applying these voltage signals to an arithmetic amplifier AM can be obtained the sum of the signals. The reference level $I_s$ can therefore be obtained from the arithmetic amplifier AM if resistors $R_i$ and $R_f$ are appropriately chosen. Since that detecting element which is under detection of the reflector 2 can be identified by comparing the reference level $I_s$ with the output voltages of the light detecting elements $D_1$ to $D_N$ by arithmetic amplifiers $A_1$ to $A_N$, the position of the reflector 2 with respect to the driverless carrier vehicle can be detected. It is a matter of course that the safety factor can be varied by controlling the resistors $R_i$ and $R_f$.

As the modifications of the embodiment of the present invention, the following examples will be easily thought of by those skilled in the art. Namely, the reflector may be replaced by a line of white paint applied, or by a non-reflecting substance especially in case where the surface of the traveling path has a high reflectivity. Moreover, the "traveling path surface" can be rewritten as the "body for supporting the reflector" in the foregoing description of the specification, that is, the traveling surface can be the support member for the curve tracer in welding, the staggering surface of a stagger crane or the like.

We claim:

1. A system for detecting reflecting objects comprising
   a reflector supported on a supporting body,
   means for directing light on said supporting body and said reflector,
   a plurality of light detecting elements for receiving reflected light from said supporting body and said reflector, each of said plurality of light detecting elements producing an electrical output in response to light received from said supporting body and said reflector, said reflector being detected by a specific one of said plurality of said light detecting elements,
   means for detecting said reflector by comparing the electrical output of said specific one of said plurality of light detecting elements with a reference signal, and
   means for generating said reference signal from the average value of all of said electrical outputs from said plurality of light detecting elements.

2. A system for detecting reflecting objects according to claim 1, wherein said reference signal is generated by increasing said average value by a predetermined factor.

3. A system for detecting reflecting objects according to claim 2, wherein said predetermined factor maintains said reference signal between said average value and said electrical output for each of said plurality of light detecting elements.

4. A system for detecting reflecting objects according to claim 2, wherein said means for generating said reference signal includes an amplifier having the electrical outputs of said plurality of light detecting elements for an input.

5. A system for detecting reflecting objects according to claim 4, wherein said means for detecting said reflector includes one of a plurality of amplifiers corresponding to said plurality of light detecting elements, each of said plurality of amplifiers having a first input of a respective electrical output of one or said plurality of light detecting elements and a second input of said reference signal.

6. A system for detecting reflecting objects according to claim 4, wherein said predetermined factor is provided by predetermined resistances for said electrical outputs being input to said amplifier.

7. A system for detecting reflecting objects according to claim 1, wherein said means for generating said reference signal includes an amplifier having the electrical outputs of said plurality of light detecting elements for an input.

8. A system for detecting reflecting objects according to claim 7, wherein said means for detecting said reflector includes one of a plurality of amplifiers corresponding to said plurality of light detecting elements, each of said plurality of amplifiers having a first input of a respective electrical output of one of said plurality of light detecting elements and a second input of said reference signal.

9. A system for detecting reflecting objects according to claim 1, wherein said supporting body is a surface of a traveling path.

* * * * *